United States Patent Office 3,577,348
Patented May 4, 1971

3,577,348
TRICHLOROTRIFLUOROETHANE WATER EMULSION SYSTEM
John Joseph Clementson, Runcorn, England, assignor to Imperial Chemical Industries Limited, London, England
No Drawing. Filed May 1, 1968, Ser. No. 725,897
Claims priority, application Great Britain, May 8, 1967, 21,221/67, 21,222/67; Aug. 14, 1967, 37,321/67, 37,719/67
Int. Cl. C11d 1/12, 7/50; B01f 17/10
U.S. Cl. 252—153
16 Claims

ABSTRACT OF THE DISCLOSURE

Cleaning compositions containing a fluorochlorohydrocarbon solvent and a sodium, ammonium or amine salt of a monosulphonic acid derivative of a di-ester of succinic acid, optionally also containing a non-ionic surfactant, ammonia, water and a stabilizer for the said solvent.

---

This invention relates to halogenated hydrocarbon compositions and uses thereof, and particularly to compositions comprising fluorochlorohydrocarbon solvents and use of such compositions for cleaning and drying articles, for example machinery, instruments, and metal articles, plastic articles and glass articles generally.

It is well known that liquid halogenated hydrocarbons, especially chlorinated aliphatic hydrocarbons, have the property of dissolving grease and oils, and that they can be used to effect degreasing of metals and other articles. One of the major disadvantages of known cleaning processes using chlorinated hydrocarbons such as tri- or perchloroethylene is that they are of limited value in the treatment of plastic and rubber articles, and it is well known to clean such materials using the fluorochlorohydrocarbon solvents which are milder than tri- or per-chloroethylene and do not harm plastic and rubber articles.

It is also well known that the chlorinated aliphatic hydrocarbons, especially trichloroethylene and perchloroethylene, can be used to dry metal and other articles since the boiling solvents have the property of removing water from articles in the form of a constant boiling mixture with the solvent. Trichloroethylene and perchloroethylene form constant boiling mixtures with water; that of tri- and water contains 13 parts by weight of trichloroethylene and 1 part by weight of water and that of perchloroethylene and water contains 5 parts by weight of perchloroethylene and 1 part by weight of water. In drying processes using these solvents, water can be removed simply by distillation since the constant boiling mixture boils at a temperature lower than the boiling point of the pure solvent. The resulting vapours are condensed and the condensate is passed to a water separator wherein the solvent is recovered for re-use. The method can be carried out efficiently in view of the appeciable water content of the azeotrope. However, as stated above, these chlorinated solvents are of limited value in treating plastic and rubber articles and it would be advantageous if fluorochlorohydrocarbon solvents could be used instead.

In addition, when trichloroethylene is employed to dry articles it is necessary either in the drying or rinsing treatments to use the solvent at a high temperature, i.e. about 87 C. Such temperatures are unsuitable for treating articles provided with coatings, for example, chromate coatings, and it would clearly be advantageous if a lower boiling fluorochlorohydrocarbon solvent could be used instead.

The mere substitution of fluorochlorohydrocarbons for the chlorohydrocarbons in known cleaning processes results in the removal of grease and oils from the articles. However none of these solvents i.e. tri-, per-fluorochlorohydrocarbons has the property of dissolving water-soluble contaminants and it has therefore been proposed to improve the cleaning properties of fluorochlorohydrocarbon solvents by using the solvent in admixture with water, but a simple physical mixture of solvent and water is not effective as a cleaning agent.

Further, the mere substitution of fluorochlorohydrocarbon solvents in the known drying processes described above is not acceptable in view of the very low water content of the constant boiling mixture which these solvents form with water. For example the constant boiling mixture of 1,2,2-trichloro-1,1,2-trifluoroethane and water contains only about 1 part by weight of water to 100 parts by weight of the solvent. Thus use of this solvent in the known drying process described above would result in slow removal of water from the surface of the boiling solvent and this could result in re-deposition of water on the article when it is withdrawn from the drying bath. Even if the mixture of solvent and water is agitated to break up the water layer, free water is nevertheless present in the system and re-deposition of water on the article is likely to result. This difficulty is not encountered using tri- or per-chloroethylene in view of the appreciable water content of the resulting constant boiling mixture.

Nevertheless, it is desirable to use these fluorochlorohydrocarbon solvents both for cleaning and for drying articles, and it has been proposed in order to make them suitable for these purposes to modify the properties of the solvents to confer upon them the ability to absorb water for example by emulsifying it.

We have now found that water can be emulsified in fluorochlorohydrocarbon solvents to form a water-in-oil emulsion if a sodium, ammonium or amine salt of the monosulphonic acid derivative of a diester of a succinic acid (commonly known as salts of sulphosuccinic esters) is incorporated into the solvent. We have found that these salts are efficient in enabling water to be emulsified in fluorochlorohydrocarbon solvents, whereas the majority of non-ionic surface active agents or anionic surface active agents, for example the sodium salt of dodecyl benzene sulphonic acid, the petroleum sulphonic acids; alkylnaphthalene sulphonates; salts of fatty acids or alkylphenoyl/alkylene oxide condensates do not have this property.

According to the present invention we provide a composition comprising a fluorochlorohydrocarbon solvent and a sodium, ammonium or amine salt of the monosulphonic acid derivative of a diester of a succinic acid.

The salts which may be employed are the sodium, ammonium and amine salts of sulphonic acids of formula

wherein R and $R_1$ may be the same or different and each represents a hydrogen atom or an alkyl or aryl group and $R_2$ and $R_3$ may be the same or different and each represents an alkyl, cycloaliphatic, aryl, alkaryl or aralkyl group containing from 7 to 12 carbon atoms and which may be substituted. We prefer to employ salts wherein R and $R_1$ each represents a hydrogen atom. Particularly good results have been obtained using salts of acids wherein each of the groups $R_2$ and $R_3$ is a nonyl group or each is an octyl group. We prefer to employ a salt which is soluble in the fluorochlorohydrocarbon solvent.

A wide variety of amines may be used to form the salt of the sulphonic acid. Amines which can be used include the primary, secondary and tertiary alkyl-amines wherein each alkyl group contains up to 3 carbon atoms. Examples of such amines are methylamine, ethylamine, n-propylamine, di-(n-propyl)amine and triethylamine. Isopropylamine is less effective than the other primary amines, and quaternary amines and phenylamines such as aniline are not suitable and are not included within the term "amine salts" as used in this specification. Diamines for example ethylene diamine, may be used.

Another class of amines which can be used are the aminoalcohols (or alcohol-amines), particularly the monoalkanolamines containing up to 3 carbon atoms, for example monoethanolamine. Di- and tri-alkanolamine salts are in general insoluble and are preferably avoided. Still further amines which may be used are the cycloaliphatic amines, for example cyclopropylamine and cyclohexylamine.

We have also found that heterocyclic compounds containing a nitrogen atom as the hetero atom may also be used and it is to be understood that these are included within the term "amine" as used in this specification. The compound may contain other hetero atoms in addition to the nitrogen atom. Examples of suitable amines of this type are pyridine, pyrrolidine, piperidine, and morpholine.

Solutions of the salt in the solvent have the property of emulsifying water and forming a water-in-oil emulsion, the amount of water which can be emulsified in this way depending upon the amount of the additive incorporated in the solvent. For any particular concentration of the salt in the solvent, there is a maximum amount of water which can be emulsified to form a water-in-oil emulsion, but any composition which contains less than this maximum has the property of taking up and emulsifying more water.

The compositions of the invention which contain water, particularly those containing appreciable quantities of water as water-in-oil emulsions, are useful as cleaning agents for articles immersed therein, particularly for freeing the articles from grease and oils, and also water-soluble contaminants.

According to a further feature of the invention, therefore, we provide a composition comprising a fluorochlorohydrocarbon solvent, a sodium, ammonium or amine salt of the monosulphonic acid derivative of a diester of a succinic acid, and water.

The compositions of the invention whether or not they contain water preferably contain a non-ionic surface active agent in addition to the salt of the sulphonic acid. Suitable non-ionic surface active agents include for example alkyl phenol/alkylene oxide condensates, particularly condensates of alkyl phenols with ethylene oxide, of formula,

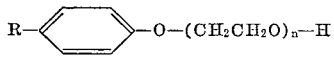

wherein R represents an alkyl group (especially a nonyl group) and $n$ has an average value of greater than 5.5. Alternative non-ionic surface active agents which may be used are the condensation products of fatty alcohols with alkylene oxides, for example condensation products of cetyl, oleyl and coconut fatty alcohols with ethylene oxide. Condensates of ethylene oxide with fatty amines and amides may also be used, for example condensates with lauric or coconut monoethanolamide, coconut diethanolamide, and cocoamine. For all the ethylene oxide condensates, we have found that efficiency of the agent increases with the ethylene oxide content of the condensate. The proportion of the non-ionic agent need not be more than twice the weight, but will usually be less than the weight of the salt of the sulphonic acid. Compositions containing water (either added deliberately to form a cleaning composition or taken up during the drying of wet articles) are in the form of emulsions, and the non-ionic surface active agent greatly improves the stability of the emulsion. It is to be understood that the proportions of the non-ionic surface active agent given above are intended merely as a general guide and that the optimum amount is different for different salts of the sulphonic acids. The amount is in fact important and should be maintained within fairly narrow limits for each particular salt used, and the optimum amount for each salt can be determined by simple experiment. We have found that when the optimum amount of the non-ionic agent is present, the maximum amount of water which can be emulsified in the composition is very much greater than when the non-ionic agent is omitted or when it is present in insufficient quantity.

As mentioned hereinbefore, the amount of water which can be emulsified in the solvent composition is limited for any particular amount of the additive in the solvent.

The compositions of the invention which are suitable for cleaning articles contain water and are in the form of water-in-oil emulsions. For most practical cleaning purposes the compositions need not contain very large quantities of water. We have found that the amount of water which is emulsified is preferably not greater than 33% by weight of the resulting emulsion. In order to be capable of emulsifying this amount of water and forming a water-in-oil emulsion there is no advantage in using a total amount of surface active agent (i.e. the salt of a sulphonic acid and the non-ionic surface active agent) greater than 33% by weight based on the water-free composition. In general the amount of water which the water-free composition is capable of emulsifying will usually be considerably less than 33% by weight based on the resulting emulsion, and we have found that for most practical purposes the total amount of surface active agent need not exceed 20% by weight of the water-free composition. In general the cleaning composition should contain at least 0.25% and preferably at least 1.0% by weight of water, and correspondingly the compositions should preferably contain at least the same amount of total surface active agent based on the water-free composition. For cleaning compositions the amount of the solvent is preferably at least 33% by weight.

For most practical cleaning operations we have found that a cleaning composition which contains about 6% of its weight of water is sufficient, and for such compositions the amount of the salt of the sulphonic acid (or if a non-ionic agent is also used then the total amount of surface active agents) need not exceed, say 2.5% by weight based on the water-free composition. We have found, for example, that a composition consisting of 91.5 parts by weight of 1,1,2-trifluoro-1,2,2-trichloroethane, 1.9 parts by weight of sodium dinonyl sulphosuccinate (the sodium salt of the monosulphonic acid derivative of the nonyl diester of succinic acid), 0.6 part by weight of a nonyl phenol/ethylene oxide condensate obtained by condensing 13 moles of ethylene oxide per mole of nonyl phenol and 6% by weight of water is suitable for most practical cleaning purposes.

The compositions which are to be used as drying agents are preferably substantially free from water, although they may contain some water providing they can emulsify additional water. The water-free composition should preferably be capable of emulsifying large amounts of water and the amount of the salt and the non-ionic agent can be as described above in respect of cleaning agents.

The fluorochlorohydrocarbon solvent constituent of the compositions can be any liquid fluorochlorohydrocarbon solvent, especially the fluorochloroalkanes for example trichlorofluoromethane and symtetrachlorodifluoroethane, and 1,2,2-trichloro-1,2,2-trifluoroethane.

We have found that more than a trace of electrolyte in the cleaning compositions causes a portion of the water to separate out into a distinct layer when the composition is allowed to stand, for instance overnight, without any form of agitation. If this phase separation occurs the separated water layer can be discharged and if appropriate fresh water can be added before the composition is re-used. Separation of the emulsions due to the presence of electrolytes is often an advantage since, after the separation, the electrolyte is present in the water layer and can be removed with that layer. Thus, for example, electrolytes entering the emulsions during cleaning of articles may cause separation of the emulsion during periods when it is not being used. Removal of the separated water layer, for example by skimming, thus removes the electrolytes from the treatment vessel and so risk of redeposition of the electrolytes on the cleaned article is reduced, thus enabling stain-free cleaning of articles to be achieved even if the articles to be cleaned are contaminated with metal salts and electrolytes. We prefer to use distilled or de-ionised water in the cleaning compositions of the invention.

Similarly in the drying of wet articles any electrolyte entering the composition together with appreciable amounts of water will cause the water to separate out when the composition is allowed to stand without agitation. This is particularly convenient since it provides a method of removing electrolytes from the composition before it is re-used.

However, if the water content of the composition is too low, for example below 2% by weight, we have observed that electrolytes do not cause the water to separate out into a distinct layer. Addition of more water will cause separation of the electrolytes and water which can then be removed by skimming off.

If required the compositions of the invention may contain one or more stabilizers. Stabilization may be required against decomposition of the solvent induced by the presence of metals, especially zinc. For example it may be necessary to stabilize the solvent to inhibit attack on metal articles being cleaned or dried or on the materials of construction of the cleaning or drying and rinsing tanks. Any of the known stabilizing additives for halogenated hydrocarbon solvents may be employed to prevent this decomposition. Examples of such stabilizing additives are nitro-alkanes and other alkyl and aryl nitro- compounds, substituted phenols, pyrroles and certain alcohols such as propargyl alcohol which is advantageously used in conjunction with nitromethane. Usually the total amount of stabilizers added will not exceed 1% by weight of the composition since some additives may tend to cause separation of the composition into distinct layers if present in amounts of greater than 1% by weight. In addition to stabilizers, compounds known to inhibit tarnishing of copper and brass may be added.

We have also found that the incorporation of ammonia into the cleaning compositions of the invention is advantageous in that some articles, especially those made of or containing copper and brass, appear brighter after treatment than when the ammonia is not present. The improved effect is especially noticeable when an ammonium or amine salt of the sulphonic acid is employed. The ammonia can be incorporated in the composition at any time and this can conveniently be immediately prior to use of the composition. The amount added is not critical but will usually be such that the composition contains from 50 to 2,000 and preferably about 500 parts by weight per million. The presence of ammonia is less beneficial in compositions used at the boil simply to dry articles since it will be evaporated from the composition. In drying compositions to be used at lower temperatures, for example in conjunction with ultrasonic agitation, the presence of ammonia may be beneficial. The addition of ammonia to the compositions slightly reduces the amount of water which the composition will emulsify, but this is not a serious disadvantage.

Cleaning or drying of articles using the appropriate composition is carried out simply by immersing the article in the composition for a suitable period of time, for example 60 seconds. The article is then removed and will generally be rinsed in a pure solvent (conveniently the same solvent as is used in the composition) to remove traces of the sulphonic acid salt or other additives which may have become deposited on the article. The cleaning composition can be used at its boiling point, thus producing sufficient agitation of the composition, both in the cleaning and in the rinsing treatments, but if desired lower temperatures, conveniently room temperature, can be used in conjunction with ultrasonic agitation. Preferably, where the rinsing is carried out in cold solvent a further rinse in boiling solvent or in solvent vapour is carried out since this enables the solvent to evaporate quickly from the article after rinsing. Drying compositions will usually be used at the boil, but they can be used at lower temperatures in conjunction with ultrasonic agitation. After drying, the articles will be rinsed as described above.

The articles, after treatment to clean or dry them have surface active agent deposited on them, and this is removed in the rinse treatment. When the composition is used at the boil it is preferred to cause the rinse liquor (which is being continuously swelled by solvent from a condenser used to condense the vapours emitted as a result of boiling) to overflow into the cleaning or the drying composition. Any surface active agent in the rinse liquor is thus transferred to the cleaning or drying composition. Free water which forms when the solvent/water vapours are condensed, is separated in a water separator and passed automatically to a drain in the case of drying processes, and back to the tank containing the composition in the case of cleaning processes.

The water-free compositions and the emulsions of the invention are stable on storage and are clear, colourless liquids. They are prepared very easily by adding the salt of the sulphonic acid derivative (and preferably also a non-ionic agent as hereinbefore described) to the solvent and stirring the mixture to dissolve the salt. In the case of cleaning compositions water is then added with stirring. The water content of the compositions is very easily adjusted by adding water to increase the content or by stripping water from the composition, for example by distillation, or by adding an electrolyte followed by skimming off the resulting water layer, to decrease the water content. Normally, using a boiling composition to dry articles there will be little or no water in the composition after use unless a large batch of wet articles is dried immediately prior to switching off the heat supply to the drying bath.

The emulsions of the invention can be used to clean metal (though special additives may be necessary to prevent corrosion of the metal), plastic, rubber, glass and other articles and the water-free compositions can be used to dry such articles. Cleaning results in the removal of grease and oil and water-soluble dirt. Drying results in the removal of water from the articles. The appropriate compositions are useful for cleaning and/or drying a wide variety of articles such as machinery and components thereof, electric instruments, wire, plastics and rubber articles and glass articles generally. The compositions also have the advantage that they do not remove or otherwise damage paints, varnishes, lacquers and other surface finishes, and articles having surface coatings of the can be cleaned and/or dried.

The invention is illustrated but in no way limited by the following examples, wherein all parts and percentages are by weight unless otherwise stated.

EXAMPLE 1

1.9 parts of sodium dinonyl sulphosuccinate and 0.6 part of a nonyl phenol/ethylene oxide condensation product available under the trade name Lubrol L were added to 91.5 parts of 1,1,2-trifluoro-1,2,2-trichloroethane and the mixture was agitated. Water was then added and the mixture again agitated to form a water-in-oil emulsion, the amount of water being such as to give an emulsion containing 6% of water based on the total emulsion. The emulsion was then used to clean articles by the following procedure.

The emulsion is placed in a tank provided with means (e.g. a transducer) for ultrasonic agitation of the composition. Pure 1,1,2 - trifluoro - 1,2,2 - trichloroethane is poured into both compartments of a two-compartment tank which is separated from the tank containing the emulsion. In the two-compartment tank the compartments are in communication through a horizontal slit in their common wall. One of the compartments (the rinsing compartment) is provided with means (e.g. a transducer) for ultrasonic agitation of the solvent in the compartment, and the other (the vapour compartment) is provided with a heater to enable the solvent therein to be boiled. The vapour compartment is provided close to its upper end with cooling coils to condense the vapour emitted by the boiling solvent and to form a vapour zone above the surface of the boiling solvent. Pure solvent is poured into the vapour compartment to a level below the slit in the common wall, and into the rinsing compartment to a level such that a slight flow results through the slit into the vapour compartment. Means are provided for collecting the liquid solvent condensing from the cooling coils of the vapour compartment and passing this liquid solvent to the rinsing compartment.

The article to be cleaned is immersed for about 30 seconds in the water-in-oil emulsion which is ultrasonically agitated. The cleaned article is then immersed for about 30 seconds in the pure solvent which is ultrasonically agitated in the rinsing compartment. The article is then held for about 30 seconds in the vapour zone of the vapour compartment in which the solvent is boiling. The article is removed from the vapour and it dries rapidly.

By this procedure a wide variety of articles have been cleaned, including for example used office machinery, wire, electrical apparatus, (e.g. sockets, plugs and switches), plastic and rubber articles, coin-operated mechanisms and lenses and microscope slides. In each case the cleaned articles were completely free from grease, oils and water-soluble dirt, and they were also free from drying stains.

It was found that when the above procedure was repeated but using a composition from which the Lubrol L had been excluded, efficient cleaning was still achieved but the emulsion showed a tendency to separate on standing for prolonged periods.

It was also found that when the procedure was repeated using the sodium salt of the monosulphonic acid of the di-octyl ester of succinic acid (sodium di-octyl sulphosuccinate), efficient cleaning was again achieved. In this case, 0.9 part of Lubrol L were required in order to confer maximum stability on the emulsion.

EXAMPLE 2

A drying composition was prepared by adding 1.9 parts of sodium dinonyl sulphosuccinate and 0.6 part of a nonyl phenol/ethylene oxide condensation product available under the trade name Lubrol L to 91.5 parts of 1,1,2-trifluoro-1,2,2-trichloroethane and agitating the resulting mixture. The composition was then used to dry articles by the following procedure:

The composition is placed in one of the compartments of a two-compartment tank in which the compartments are in communication by a horizontal slit in the common wall. The upper level of the composition is below this slit, and pure 1,1,2-trifluoro-1,2,2-trichloroethane is poured into the other compartment (the rinsing compartment) to a level such that a slight overflow results through the slit into the composition. The two compartments are provided with heating coils to enable the composition and the pure solvent to be boiled. Cooling coils are provided to condense vapours emitted from the compartments as a result of this boiling, means being provided for passing the total condensates (consisting of pure solvent initially but also water once a wet article has been introduced into the drying composition) to a water separator from which the pure solvent can be returned to the rinsing compartment.

Both the drying composition and the pure solvent in the rinsing compartment are boiled continuously and the wet articles to be dried is immersed in the drying composition. The composition froths initially but the froth rapidly disperses. After a suitable period of time, usually about 30 seconds, the article is removed from the composition and is immediately immersed in the pure solvent in the rinsing compartment, again for a period of about 30 seconds. The dried article is then removed from the rinse liquor. During this drying procedure, condensed solvent is continuously introduced into the rinsing compartment from the water separator, and this causes the rinsing liquor, consisting essentially of pure solvent, to overflow through the slit into the drying composition. In this way any surface active agent which enters the missing compartment as a result of rinsing of the articles is gradually returned to the drying composition.

A variety of articles were each treated separately as follows. The article was held under a tap until it was thoroughly wet with water. The water on the article was usually in the form of drops (especially in the case of plastic or rubber articles) and/or a film, and articles of complicated shape, for example electrical equipment, contained water in holes and various undercut portions. The article was immersed in the boiling drying composition for a period of about 30 seconds and was then immersed in the rinsing compartment containing boiling rinsing liquor again for a period of 30 seconds. The drying ability of the composition was tested on a wide variety of articles, including for example office machinery, wire, electrical circuits and apparatus, e.g. electrical sockets, plugs and switches, plastic and rubber articles, and lenses and microscope slides. In each case no traces of water were detectable on the treated articles. Moreover, the treated (dried) articles were completely free from staining.

During periods when the apparatus was not in use, the composition and the rinsing liquor were allowed to cool, and 6% by weight of water, based on the total composition was added to the drying composition which was then stirred until a homogeneous emulsion was formed. It was found that after drying articles which contained water to which an electrolyte had been added, a water layer had formed overnight on the surface of the composition. This layer was skimmed off prior to re-use of the composition and it was found that the composition continued to dry articles without causing staining.

It was found that when the above procedure was repeated but using a composition from which the Lubrol L was omitted, efficient drying of articles was still achieved.

EXAMPLE 3

1.7 parts by weight of ammonium dinonyl sulphosuccinate and 0.5 part by weight of a nonyl phenol/ethylene oxide condensation product available under the trade name Lubrol L were added to 91.5 parts by weight of 1,1,2-trichloro-1,2,2-trifluoroethane and the mixture was agitated. Water was then added and the mixture again agitated to form a water-in-oil emulsion, the amount of water being such as to give an emulsion containing 6% by weight of water based on the total emulsion. 0.156 part of concentrated ammonium hydroxide solution (specific gravity 0.88) were added to the emulsion which was again agitated. The amount of ammonia present in the emulsion was about 500 parts per million.

This mixture was placed in the vessel described in Example 1 provided with means for ultrasonic agitation of the composition. Electricity consumption measuring devices, containing plastic cogs, printed dial-plates, brass bushes and screws and copper connectors and which where contaminated with oil, grease, general dust and tarnish on the copper and brass components were treated using the above composition by the method as described in Example 1. After subsequently rinsing of the devices in the ultrasonically agitated pure solvent and then rinsing by immersion in the vapour produced by boiling the solvent, the articles were examined visually. They were found to be completely free from oil, grease and dust and the copper and brass components were free from tarnish.

The plastic cogs and painted dial plates were found not to have been swelled or damaged in any way.

The procedure was repeated, but using the methylamine salt of dinonyl sulphosuccinate instead of the ammonium salt, with similar results.

EXAMPLE 4

The cleaning composition described in Example 1 was placed in one compartment of a tank and pure 1,1,2,-trichloro-1,2,2-trifluoroethane was placed in two adjacent compartments of the tank, each compartment being provided with a heater so that the contents could be boiled.

The composition and the pure solvent in the adjacent compartments of the tank were heated to the boil, and valve assemblies (the metal components of the valve assembled on a glass support, i.e. prior to sealing in a glass envelope) contaminated with grease, finger marks and general dust were immersed in the boiling composition for a period of 60 seconds after which they were withdrawn and immersed in the first tank of boiling solvent to rinse any surface active agent from the assemblies. Rinsing was for about 60 seconds, followed by a second rinse for about 60 seconds in the second tank of boiling solvent. On withdrawal from the second tank the assemblies dried rapidly and were found to be free from contamination. It was found that when the assemblies were sealed into glass envelopes, no difficulties were encountered due to inefficient cleaning of the valve assemblies.

What we claim is:

1. A water emulsifiable fluorochlorohydrocarbon solvent composition consisting essentially of:
   (a) at least 33% by weight of 1,1,2-trichloro-1,2,2-trifluoroethane solvent; and
   (b) from 0.25 to 33% by weight of surface active agent composition containing at least one 1,1,2-trichloro-1,2,2-trifluoroethane solvent soluble surface active salt of a sulphonic acid selected from the group consisting of sodium, ammonium and amine salts of derivatives of sulphosuccinic acid of formula

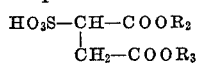

wherein $R_2$ and $R_3$ may be the same or different and each is an alkyl group containing from 7 to 9 carbon atoms and the amine salt is selected from the group consisting of monoethanolamine salts and primary, secondary and tertiary alkylamine salts wherein the alkyl is methyl, ethyl and propyl.

2. A composition according to claim 4 which contains up to 33% by weight of water, based on the total weight of the said composition.

3. A composition as claimed in claim 2 which is a water-in-oil emulsion containing up to 33% by weight of water.

4. A composition as claimed in claim 1 wherein the surface active agent composition also contains a non-ionic surface active agent which is a condensation product of ethylene oxide with a fatty alcohol, fatty amine, fatty acid monoethanolamide or alkyl phenol wherein the alkyl is octyl or nonyl, and wherein the proportion of said non-ionic surface active agent is no more than twice the weight of said sulphosuccinic acid derivative.

5. A composition as claimed in claim 4 which contains a non-ionic surface active agent which is a condensation product of ethylene oxide with one or more fatty alcohols.

6. A composition as claimed in claim 4 which contain a non-ionic surface active agent which is a condensation product of an alkyl phenol and ethylene oxide of formula

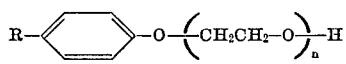

wherein R is octyl or nonyl and $n$ has an average value of greater than 5.5.

7. A composition as claimed in claim 5 wherein the fatty alcohol is selected from the group consisting of cetyl alcohol, oleyl alcohol and coconut fat alcohols.

8. A composition as claimed in claim 6 wherein the alkyl group is a nonyl group.

9. A composition as claimed in claim 1 wherein $R_2$ and $R_3$ are alkyl groups containing 8 to 9 carbon atoms.

10. A composition as claimed in claim 1 which additionally contains ammonia in an amount from 50 to 2,000 parts by weight per million.

11. A composition as claimed in claim 1 wherein the solvent contains stabilizer therefor to inhibit decomposition of the said solvent caused by zinc.

12. A composition according to claim 11 wherein the stabilizer is selected from the group consisting of alkyl and aryl nitro-compounds, substituted phenols and pyrroles.

13. A composition as claimed in claim 12 wherein the stabilizer is a nitroalkane.

14. A composition as claimed in claim 13 wherein the nitroalkane is nitromethane.

15. A method of cleaning articles which comprises immersing them in a composition as claimed in claim 2 and thereafter rinsing said articles in pure 1,1,2-trichloro-1,2,2-trifluoroethane.

16. A method of drying articles which comprises immersing them in a composition as claimed in claim 2.

References Cited

UNITED STATES PATENTS

| | | | |
|---|---|---|---|
| 3,355,391 | 11/1967 | Eiseman | 252—153 |
| 3,352,790 | 11/1967 | Sugarman et al. | 252—171 |
| 3,336,232 | 8/1967 | Bauer et al. | 252—153 |
| 3,042,479 | 7/1962 | Hicks et al. | 8—142 |
| 2,785,135 | 3/1957 | Mathews et al. | 252—161 |
| 2,028,091 | 1/1936 | Jaeger | 252—354X |
| 3,407,144 | 10/1968 | Bath | 252—108 |
| 3,285,858 | 11/1966 | Hirsch | 252—171 |
| 3,342,740 | 9/1967 | Kazmierizak | 252—153 |

FOREIGN PATENTS

| | | | |
|---|---|---|---|
| 714,980 | 8/1965 | Canada | 8—142 |
| 1,041,540 | 9/1966 | Great Britain. | |

LEON D. ROSDOL, Primary Examiner

D. L. ALBRECHT, Assistant Examiner

U.S. Cl. X.R.

252—152, 161, 171, 353, 355